US011850960B2

(12) United States Patent
Gontarz et al.

(10) Patent No.: US 11,850,960 B2
(45) Date of Patent: Dec. 26, 2023

(54) LIQUID COOLED CHARGING CABLE SYSTEM

(71) Applicant: Southwire Company, LLC, Carrollton, GA (US)

(72) Inventors: Benjamin Jacob Gontarz, Medina, OH (US); Subash Shrestha, Avon Lake, OH (US)

(73) Assignee: Southwire Company, LLC, Carrollton, GA (US)

(*) Notice: Subject to any disclaimer, the term of this patent is extended or adjusted under 35 U.S.C. 154(b) by 0 days.

(21) Appl. No.: 17/704,813

(22) Filed: Mar. 25, 2022

(65) Prior Publication Data

US 2022/0212554 A1    Jul. 7, 2022

Related U.S. Application Data

(63) Continuation of application No. 16/845,595, filed on Apr. 10, 2020, now Pat. No. 11,472,304, which is a
(Continued)

(51) Int. Cl.
*B60L 53/18* (2019.01)
*B60L 53/16* (2019.01)
(Continued)

(52) U.S. Cl.
CPC .............. *B60L 53/18* (2019.02); *B60L 53/14* (2019.02); *B60L 53/16* (2019.02); *B60L 53/302* (2019.02);
(Continued)

(58) Field of Classification Search
CPC .......... B60L 53/18; B60L 53/14; B60L 53/16; B60L 53/302; H01B 7/423; H01B 7/425; H01B 9/006
See application file for complete search history.

(56) References Cited

U.S. PATENT DOCUMENTS 1,866,611 A    5/1929  Affel
2,939,902 A    6/1960  Wreford
(Continued)

FOREIGN PATENT DOCUMENTS

CN    204289984 U    4/2015
DE    2507493 A1    9/1976
(Continued)

OTHER PUBLICATIONS

International Search Authority-206 dated Aug. 24, 2017 cited in Application No. PCT/2017/032859, 15 pgs.
(Continued)

*Primary Examiner* — Paresh Paghadal
(74) *Attorney, Agent, or Firm* — Merchant & Gould P.C.

(57) ABSTRACT

A liquid cooled charging cable system may be provided. The liquid cooled charging cable system may comprise a source, a load, a liquid cooled charging cable, and a cooling device. The liquid cooled charging cable may connect the source to the load, and may supply electric energy from the source to the load. The liquid cooled charging cable may comprise a supply conductor and a return conductor. The cooling device may pump a coolant around the supply conductor and the return conductor where the supply conductor and the return conductor may be immersed in the coolant.

17 Claims, 4 Drawing Sheets

Related U.S. Application Data continuation of application No. 15/596,020, filed on May 16, 2017, now Pat. No. 10,811,170.

(60) Provisional application No. 62/339,321, filed on May 20, 2016.

(51) Int. Cl.
*B60L 53/302* (2019.01)
*B60L 53/14* (2019.01)
*H01B 7/42* (2006.01)
*H01B 9/00* (2006.01)
*H01R 13/00* (2006.01)

(52) U.S. Cl.
CPC .............. *H01B 7/423* (2013.01); *H01B 9/006* (2013.01); *H01R 13/005* (2013.01); *H01B 7/425* (2013.01); *Y02T 10/70* (2013.01); *Y02T 10/7072* (2013.01); *Y02T 90/12* (2013.01); *Y02T 90/14* (2013.01)

(56) References Cited

U.S. PATENT DOCUMENTS

| | | |
|---|---|---|
| 3,808,350 A | 4/1974 | Kluge et al. |
| 3,835,240 A | 9/1974 | Matthaus |
| 3,949,154 A | 4/1976 | Rasquin |
| 4,310,718 A | 1/1982 | Eng |
| 4,607,133 A | 8/1986 | Alloin et al. |
| 4,647,712 A | 3/1987 | Alloin et al. |
| 5,670,860 A | 9/1997 | Conrady et al. |
| 5,909,099 A | 6/1999 | Watanabe et al. |
| 6,100,467 A | 8/2000 | Kroulik |
| 6,396,241 B1 | 5/2002 | Ramos et al. |
| 2005/0006116 A1 | 1/2005 | Rehig |
| 2010/0277127 A1* | 11/2010 | Flack .................... B60L 53/302 254/134.3 R |
| 2015/0217654 A1* | 8/2015 | Woo ........................ B60L 53/16 320/109 |
| 2017/0144558 A1 | 5/2017 | Remisch |

FOREIGN PATENT DOCUMENTS

| | | |
|---|---|---|
| DE | 102015114133 A1 | 3/2017 |
| DE | 1020151200048 A1 | 5/2017 |
| EP | 0237441 A2 | 9/1987 |
| EP | 1454739 B1 | 10/2007 |
| FR | 2444999 | 7/1980 |
| GB | 359364 A | 10/1931 |
| GB | 875930 A | 8/1961 |
| GB | 906695 A | 9/1962 |
| JP | 2004135386 A | 4/2004 |
| JP | 20151000188 A | 5/2015 |

OTHER PUBLICATIONS

International Search Report dated Nov. 29, 2017 cited in Application No. PCT/2017/032859, 21 pgs.

* cited by examiner

LIQUID COOLED CHARGING CABLE SYSTEM

RELATED APPLICATIONS

This application is a continuation of U.S. patent application Ser. No. 16/845,595, filed Apr. 10, 2020, which is a continuation of U.S. patent application Ser. No. 15/596,020 filed May 16, 2017, (U.S. Pat. No. 10,811,170), which claims the benefit under provisions of 35 U.S.C. § 119(e), of U.S. Provisional Patent Application No. 62/339,321, filed May 20, 2016, the disclosure of each of which is incorporated herein by reference in its entirety.

BACKGROUND

An electric vehicle (EV) charging system, also called an electric recharging point, a charging point, a charging station a charge point, and an EVSE (Electric Vehicle Supply Equipment), is an element in an infrastructure that supplies electric energy for recharging electric vehicles, such as plug-in electric vehicles, including electric cars, neighborhood electric vehicles, and plug-in hybrids. Because plug-in hybrid electric vehicles and battery electric vehicle ownership is expanding, there is a growing need for widely distributed publicly accessible charging stations, some of which support faster charging at higher voltages and currents than are available from residential EVSEs. Many charging stations are on-street facilities provided by electric utility companies or located at retail shopping centers and operated by private companies. These charging stations provide one or a range of heavy duty or special connectors that conform to the variety of electric charging connector standards.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
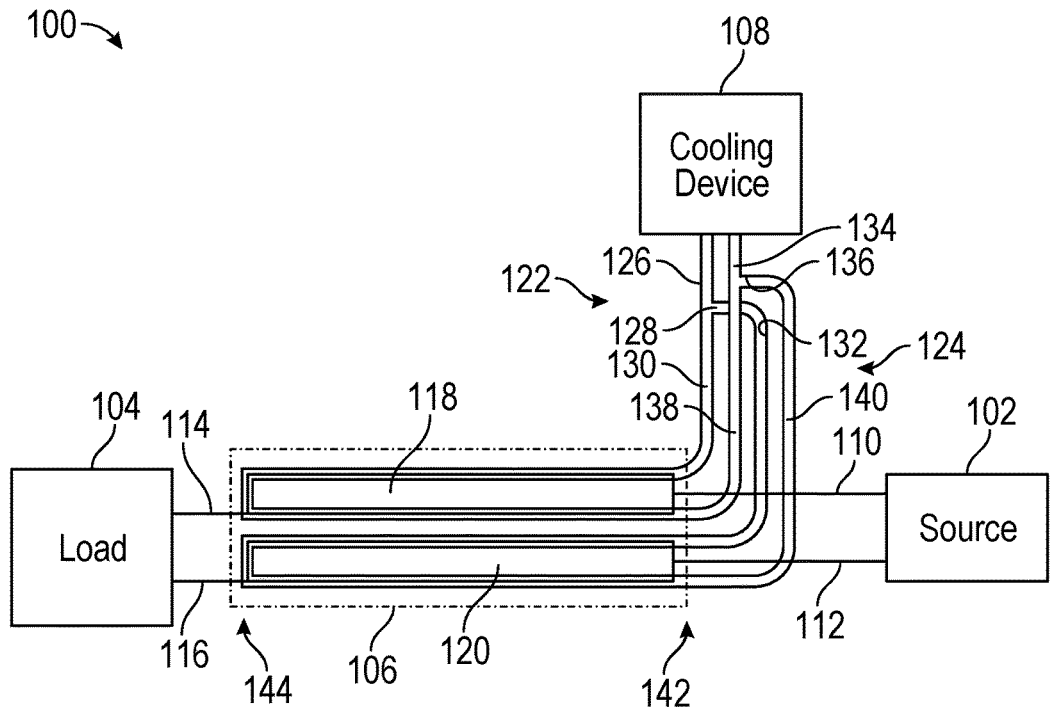
FIG. 1 shows a liquid cooled charging system.

A liquid cooled charging cable system may be provided. The liquid cooled charging cable system may comprise a source, a load, a liquid cooled charging cable, and a cooling device. The liquid cooled charging cable may connect the source to the load, and may supply electric energy from the source to the load. The liquid cooled charging cable may comprise a supply conductor and a return conductor. The cooling device may pump a coolant around the supply conductor and the return conductor where the supply conductor and the return conductor may be immersed in the coolant.

Both the foregoing overview and the following example embodiments are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the example embodiments.

EXAMPLE EMBODIMENTS

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

A charging system may be used to charge a battery or batteries, for example, an electric vehicle's batteries. Consistent with embodiments of the disclosure, electric vehicles may comprise, but are not limited to, electric cars, neighborhood electric vehicles, fork lifts, plug-in hybrids, etc. When batteries are charged, the time required to charge the batteries may be governed by the amount of current that a charging system can deliver to the batteries. One of the limiting factors for increasing the amount of charge current to the batteries and therefore reducing the amount of charge time may be the cable that connects an electric power source to the batteries.

Conventional systems may use an air cooled charging cable in battery charging applications, for example, in applications where the charging current is below 200 A. As the electric charging current increases above 200 A, the corresponding required size of the charging cable used to charge the batteries may become too large, too heavy, and too inflexible for a consumer to use. Consistent with embodiments of the disclosure, a liquid cooled charging cable may be provided. The liquid cooled charging cable may supply currents (e.g., 400 A to 1,000 A) that may be 2 to 5 times as much as the currents supplied by the conventional air cooled charging cable, but unlike the conventional air cooled charging cable, in a size, weight, and flexibility suitable for a consumer to use. Conventional liquid cooled charging cables electrically isolate the cooling liquid from metallic conductor components to prevent shorts between conductors or to ground through the liquid. The conventional approach limits the benefit of liquid cooling by adding a thermally insulating layer between the conductor and the cooling liquid.

Consistent with embodiments of the disclosure, liquid coolant from a cooling device may be pumped directly around an electrical conductor (e.g., bare, uninsulated) and into an input terminal connector and an output terminal connector attached to the electrical conductor in order to cool these components. Accordingly, cooling of the electrical conductor, the input terminal connector, and the output terminal connector by the coolant may greatly limit thermal resistance in the electrical conductor, the input terminal connector, and the output terminal connector associated with these components due to heating caused by high electrical currents in the these components.

The liquid coolant maybe provided by either two independent isolated cooling devices or by one cooling device that has a sufficient liquid column length from the conductor to the cooling device or bifurcation point of the liquid coolant. The liquid column length along with an appropriate coolant conductivity may provide the required electrical isolation between a supply conductor and a return conductor and either of these conductors to grounded cooling pumps or associated hardware.

FIG. 1 shows a liquid cooled charging system 100 consistent with embodiments of the disclosure. As shown in FIG. 1, liquid cooled charging system 100 may comprise a source 102, a load 104, a liquid cooled charging cable 106, and a cooling device 108. Source 102 may connect to liquid cooled charging cable 106 via a source supply connection 110 and a source return connection 112. Load 104 may connect to liquid cooled charging cable 106 via a load supply connection 114 and a load return connection 116. Liquid cooled charging cable 106 may comprise a supply conductor 118 and a return conductor 120. Source 102 may comprise a power supply capable of charging load 104 comprising an energy storage device, for example, a battery or bank of batteries.

Coolant may be provided to both supply conductor 118 and return conductor 120 of liquid cooled charging cable 106 by cooling device 108 via coolant supply conduit 122 and coolant return conduit 124. Supply conduit 122 and coolant return conduit 124 may be made from electrically non-conductive material and may have sufficient length to minimize the leakage current to ground or between supply conductor 118 and return conductor 120. Coolant supply conduit 122 may comprise a coolant supply conduit main section 126, a coolant supply conduit bifurcation point 128, a coolant supply conduit first section 130, and a coolant supply conduit second section 132. Coolant return conduit 124 may comprise a coolant return conduit main section 134, a coolant return conduit bifurcation point 136, a coolant return conduit first section 138, and a coolant return conduit second section 140.

Source 102 may connect to liquid cooled charging cable 106 via source supply connection 110 and a source return connection 112 at a source end 142 of liquid cooled charging cable 106. Load 104 may connect to liquid cooled charging cable 106 via a load supply connection 114 and a load return connection 116 at a load end 144 of liquid cooled charging cable 106. The coolant may be supplied from coolant supply conduit 122 and returned to coolant return conduit 124 at source end 142 of liquid cooled charging cable 106.

Cooling device 108 may pump the coolant into coolant supply conduit main section 126. The coolant by then feed into both coolant supply conduit first section 130 and coolant supply conduit second section 132 at coolant supply conduit bifurcation point 128. Coolant supply conduit first section 130 may feed coolant to supply conductor 118 of liquid cooled charging cable 106. Coolant supply conduit second section 132 may feed coolant to return conductor 120 of liquid cooled charging cable 106. The coolant may circulate through liquid cooled charging cable 106. A portion of the coolant may return into coolant return conduit first section 138 and a portion of the coolant may return into coolant return conduit second section 140. The returned coolant may come together at coolant return conduit bifurcation point 136 into coolant return conduit main section 134 and back into cooling device 108. Cooling device 108 may cool the returned coolant that may have absorbed heat from liquid cooled charging cable 106. Cooling device 108 may reuse the returned coolant by pumping it back into coolant supply conduit main section 126.

Figure 2:
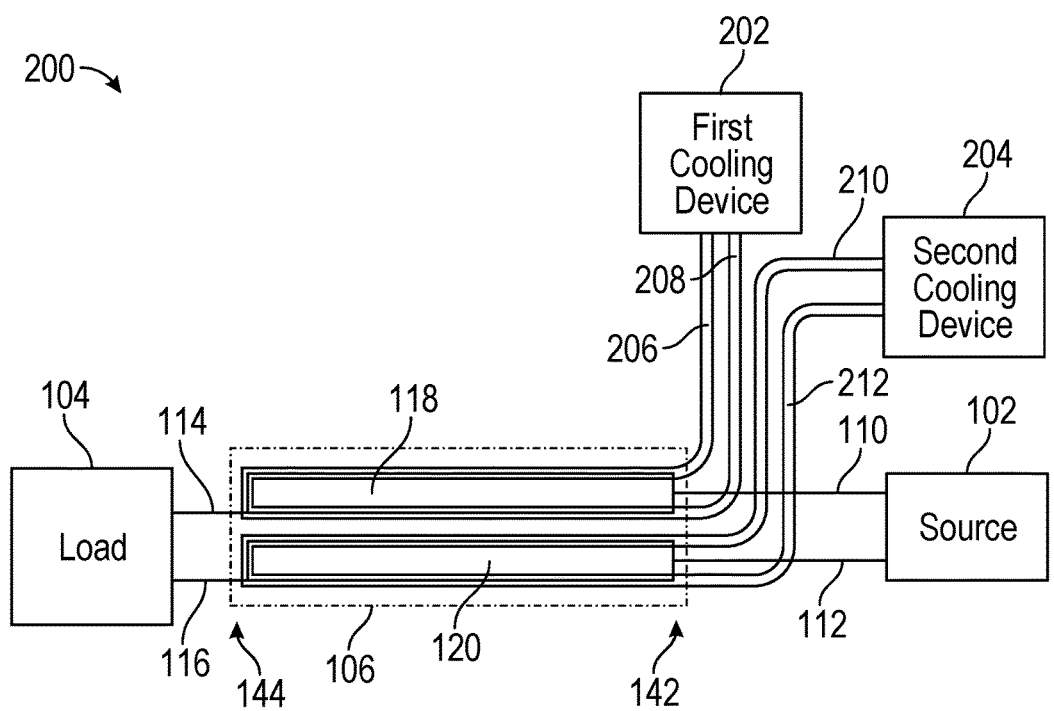
FIG. 2 shows a liquid cooled charging system.

FIG. 2 shows a liquid cooled charging system 200 consistent with embodiments of the disclosure. Liquid cooled charging system 200 may be similar to liquid cooled charging system 100; however, liquid cooled charging system 200 may comprise two cooling devices rather than one cooling device. As shown in FIG. 2, liquid cooled charging system 200 may comprise a first cooling device 202 and a second cooling device 204. Coolant may be provided to supply conductor 118 of liquid cooled charging cable 106 by first cooling device 202 via a first coolant supply conduit 206 and returned from supply conductor 118 to first cooling device 202 via a first coolant return conduit 208. Similarly, coolant may be provided to return conductor 120 of liquid cooled charging cable 106 by second cooling device 204 via a second coolant supply conduit 210 and returned from return conductor 120 to second cooling device 204 via a second coolant return conduit 212. The conduits (e.g., first coolant supply conduit 206, first coolant return conduit 208, second coolant supply conduit 210, and second coolant return conduit 212) may be made from electrically non-conductive material and have sufficient length to minimize the leakage current to ground or between supply conductor 118 and return conductor 120.

Figure 3:
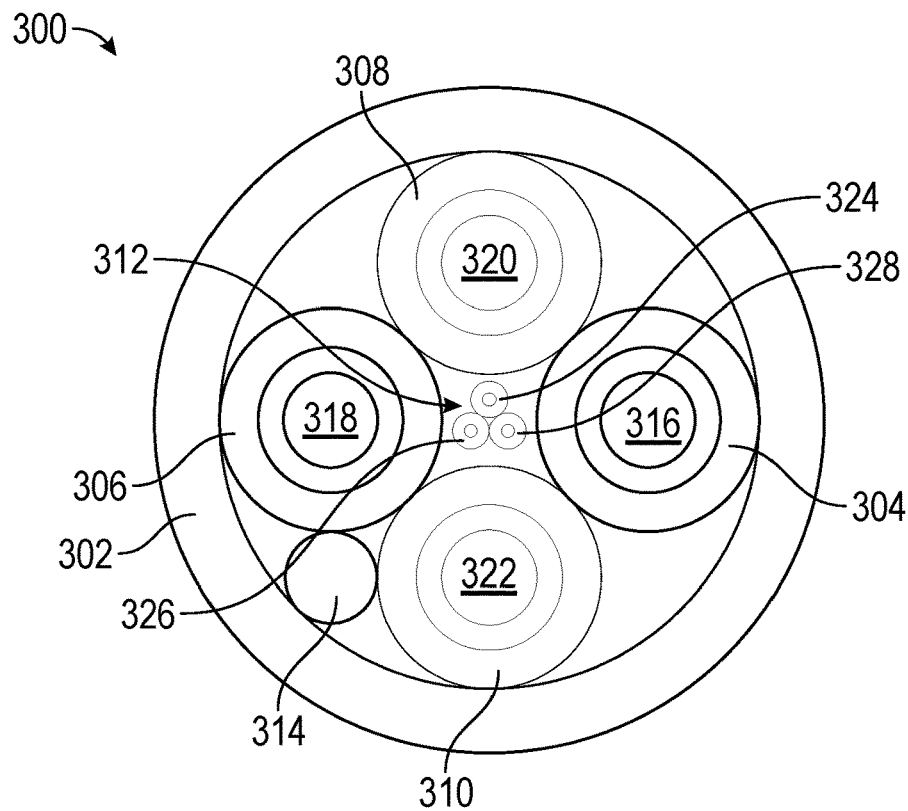
FIG. 3 shows a liquid cooled charging cable.

FIG. 3 shows a cross-section of a liquid cooled charging cable 300. Liquid cooled charging cable 300 may comprise liquid cooled charging cable 106 as described above with respect to FIG. 1 and FIG. 2. As shown in FIG. 3, liquid cooled charging cable 300 may comprise a jacket 302. Jacket 302 may comprise a first supply hose 304, a first return hose 306, a second supply hose 308, a second return hose 310, a pilot cable 312, and a ground wire 314. First supply hose 304 may comprise a first supply sub-conductor 316, first return hose 306 may comprise a second supply sub-conductor 318, second supply hose 308 may comprise a first return sub-conductor 320, and second return hose 310 may comprise a second return sub-conductor 322. Pilot cable 312 may comprise a first pilot wire 324, a second pilot wire 326, and a third pilot wire 328.

Figure 4:
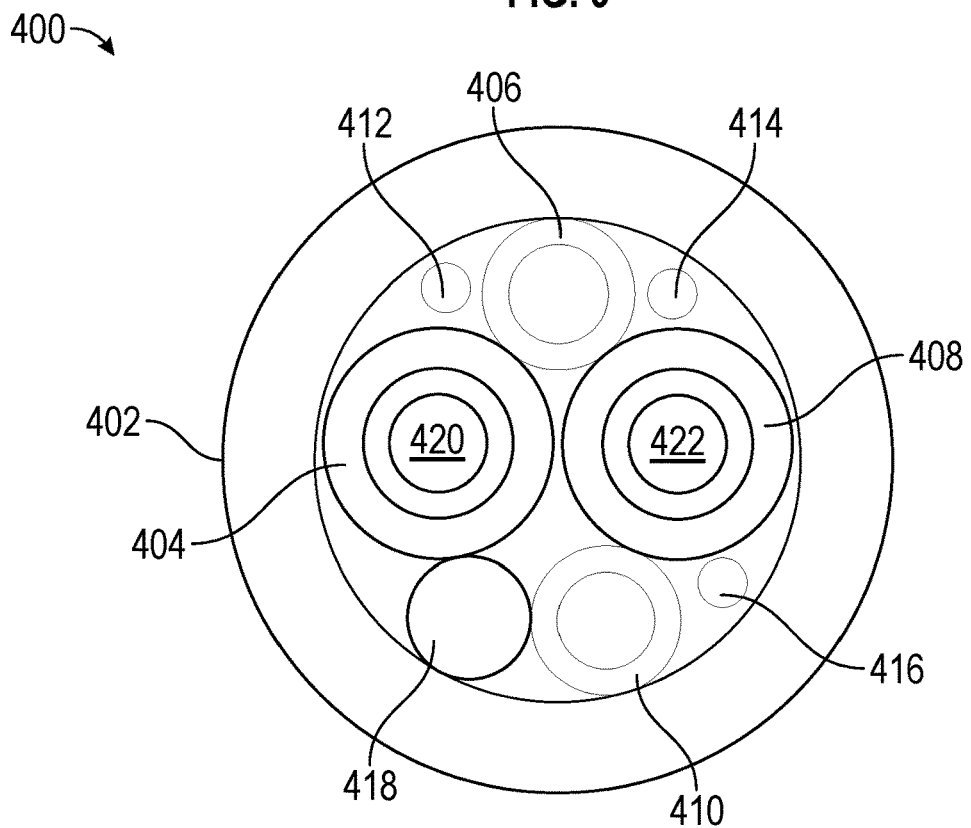
FIG. 4 shows a liquid cooled charging cable.

FIG. 4 shows a cross-section of a liquid cooled charging cable 400. Liquid cooled charging cable 400 may comprise liquid cooled charging cable 106 as described above with respect to FIG. 1 and FIG. 2. As shown in FIG. 4, liquid cooled charging cable 400 may comprise a jacket 402. Jacket 402 may contain a first supply hose 404, a first return hose 406, a second supply hose 408, and a second return hose 410. In addition, jacket 402 may contain a first pilot wire 412, a second pilot wire 414, a third pilot wire 416, and a ground wire 418. First supply hose 404 may comprise a supply conductor 420 and second supply hose 408 may comprise a return conductor 422.

Pilot cable 312 (i.e., first pilot wire 324, second pilot wire 326, and third pilot wire 328) of FIG. 3 may be used to send control signals or supply power to elements located at source 102 and load 104. Similarly, first pilot wire 412, second pilot wire 414, and third pilot wire 416 of FIG. 4 may be used to send control signals or supply power to elements located at source 102 and load 104. The pilot wires may be located at the center of liquid cooled charging cable 300 as pilot cable 312 as shown in FIG. 3 or the pilot wires may be located individually at any location within jacket 402 as shown in FIG. 4 as pilot wire 412, second pilot wire 414, and third pilot wire 416. Embodiments of the disclosure may comprise any number of pilot wires and is not limited to three. Ground wire 314 of liquid cooled charging cable 300 and ground wire 418 of liquid cooled charging cable 400 may be used to connect source 102 and load 104 and maintain them at a common ground.

Figure 5A:
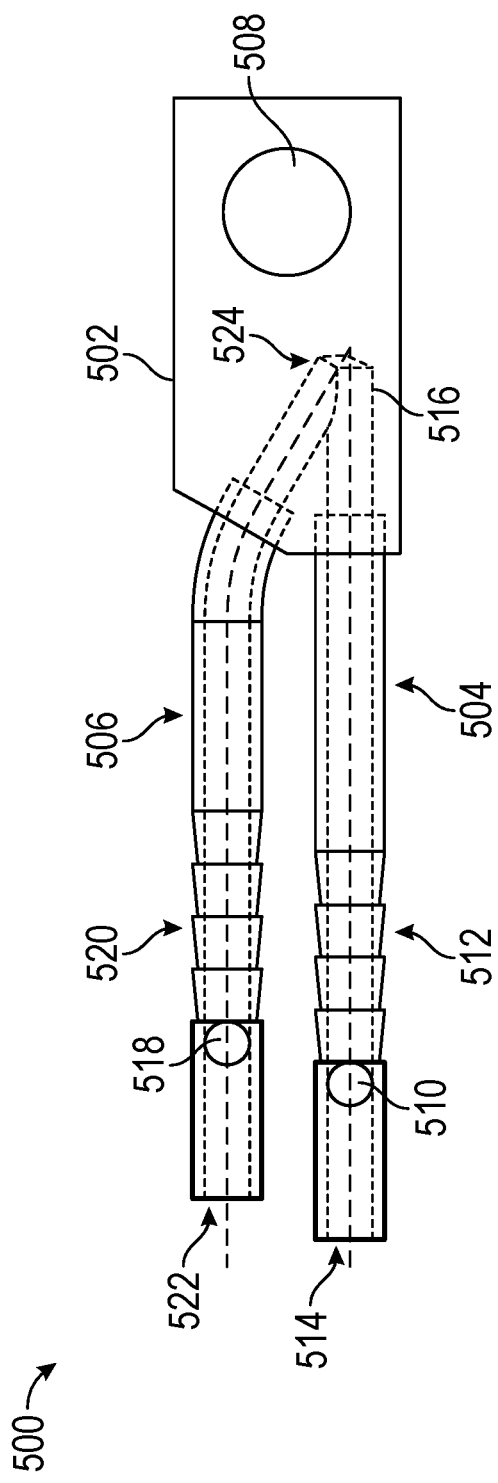
FIG. 5A and FIG. 5B show an output terminal.
Figure 5B:
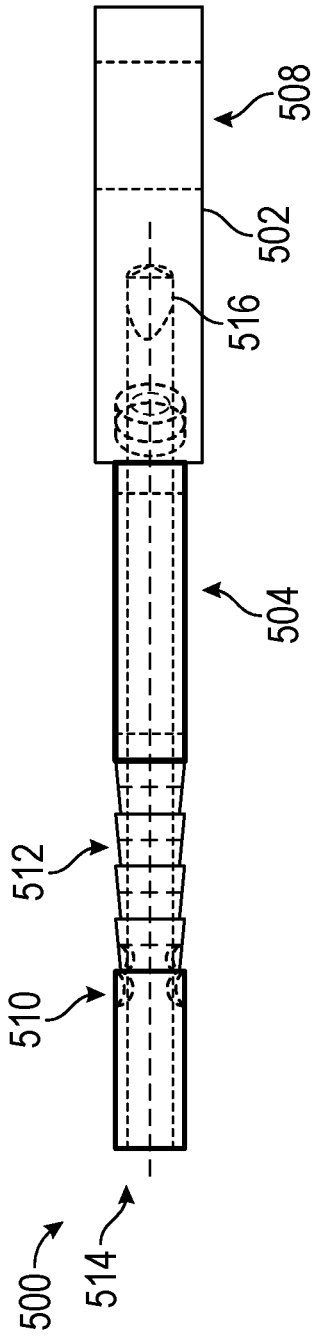

FIG. 5A and FIG. 5B show an output terminal 500 that may comprise load supply connection 114 and load return connection 116 as shown in FIG. 1 and FIG. 2. Output terminal 500 may be made of an electrically conductive material. As shown in FIG. 5A and FIG. 5B, output terminal 500 may comprise an output terminal tab 502, a first output terminal tube 504, and a second output terminal tube 506. Output terminal tab 502 may comprise an output terminal tab opening 508. First output terminal tube 504 may comprise a first output terminal tube port 510, a plurality of first output terminal tube barbs 512, a first output terminal tube first end 514, and a first output terminal tube second end 516. Second output terminal tube 506 may comprise a second output terminal tube port 518, a plurality of second output terminal tube barbs 520, a second output terminal tube first end 522, and a second output terminal tube second end 524.

Output terminal 500 may comprise load supply connection 114. As described in greater detail below, output terminal 500 may be installed on supply conductor 118 of liquid cooled charging cable 106 at load end 144 of liquid cooled charging cable 106. A fastener (e.g., a bolt) may be placed through output terminal tab opening 508 in order to fasten output terminal tab 502 (load supply connection 114) to, for example, a positive lead of load 104. Similarly, output terminal 500 may comprise load return connection 116. As described in greater detail below, output terminal 500 may be installed on return conductor 120 of liquid cooled charging cable 106 at load end 144 of liquid cooled charging cable 106. A fastener (e.g., a bolt) may be placed through output terminal tab opening 508 in order to fasten output terminal tab 502 (as load return connection 116) to, for example, a negative lead of load 104.

Consistent with embodiments of the disclosure, the coolant may cool output terminal tab 502. The coolant may enter first output terminal tube 504 at first output terminal tube port 510, pass through first output terminal tube 504 to first output terminal tube second end 516, enter second output terminal tube 506 at second output terminal tube second end 524, and exit second output terminal tube 506 at second output terminal tube port 518. Consequently, the coolant may absorb heat from output terminal tab 502. Consistent with embodiments of the disclosure, the coolant may flow in an opposite direction entering second output terminal tube port 518 and exiting first output terminal tube port 510.

Figure 6A:
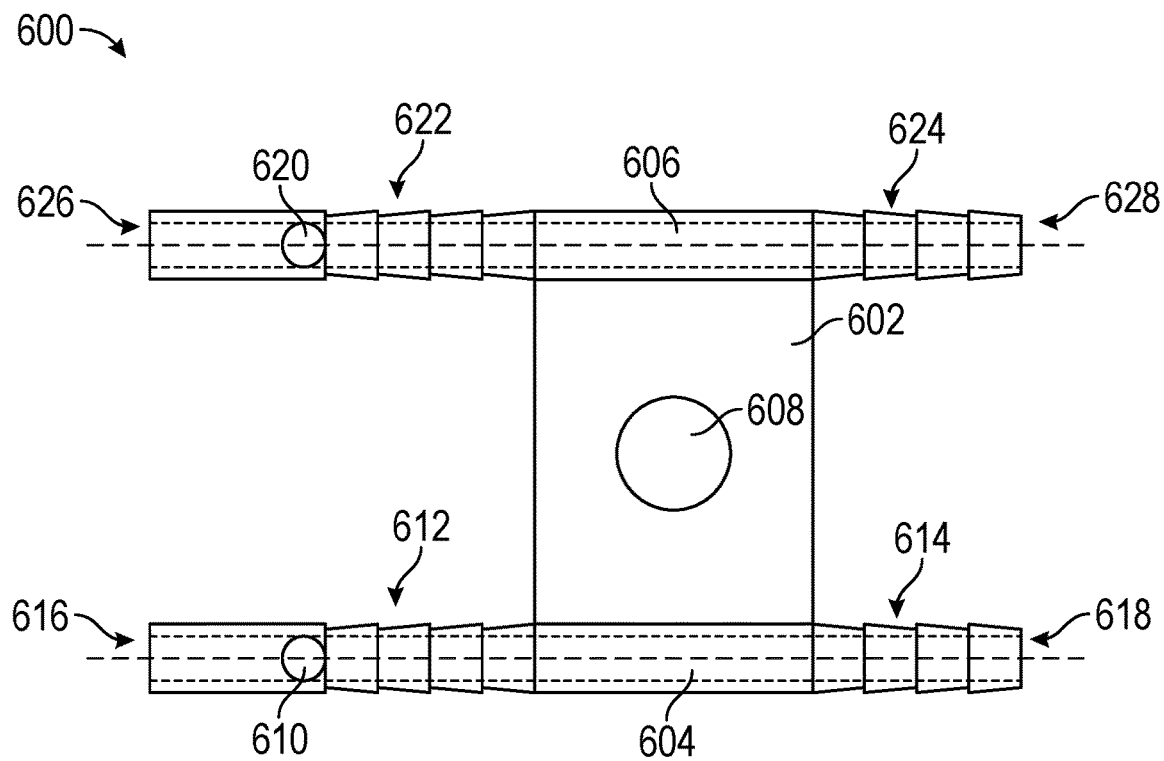
FIG. 6A and FIG. 6B show an input terminal.
Figure 6B:
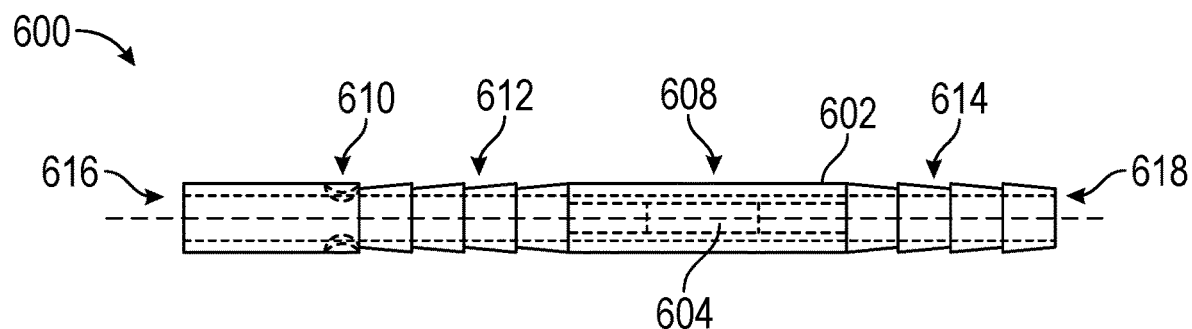

FIG. 6A and FIG. 6B show an input terminal 600 that may comprise source supply connection 110 and source return connection 112 as shown in FIG. 1 and FIG. 2. Input terminal 600 may be made of an electrically conductive material. As shown in FIG. 6A and FIG. 6B, input terminal 600 may comprise an input terminal tab 602, a first input terminal tube 604, and a second input terminal tube 606. Input terminal tab 602 may comprise an input terminal tab opening 608. First input terminal tube 604 may comprise a first input terminal tube port 610, a first plurality of first input terminal tube barbs 612, a second plurality of first input terminal tube barbs 614, a first input terminal tube first end 616, and a first input terminal tube second end 618. Second input terminal tube 606 may comprise a second input terminal tube port 620, a first plurality of second input terminal tube barbs 622, a second plurality of second input terminal tube barbs 624, a second input terminal tube first end 626, and a second input terminal tube second end 628.

Input terminal 600 may comprise source supply connection 110. As described in greater detail below, input terminal 600 may be installed on supply conductor 118 of liquid cooled charging cable 106 at source end 142 of liquid cooled charging cable 106. A fastener (e.g., a bolt) may be placed through input terminal tab opening 608 in order to fasten input terminal tab 602 (source supply connection 110) to, for example, a positive lead of source 102. Similarly, input terminal 600 may comprise source return connection 112. As described in greater detail below, input terminal 600 may be installed on return conductor 120 of liquid cooled charging cable 106 at source end 142 of liquid cooled charging cable 106. A fastener (e.g., a bolt) may be placed through input terminal tab opening 608 in order to fasten input terminal tab 602 (as source return connection 112) to, for example, a negative lead of source 102.

Consistent with embodiments of the disclosure, the coolant may cool output terminal tab 602. The coolant may enter first input terminal tube 604 at first input terminal tube port 610, pass through first input terminal tube 604, and exit first input terminal tube 604 at first input terminal tube second end 618. Similarly, the coolant may enter second input terminal tube 606 at second input terminal tube port 620, pass through second input terminal tube 606, and exit second input terminal tube 606 at second input terminal tube second end 628. Consequently, the coolant may absorb heat from input terminal tab 602.

Consistent with embodiments of the disclosure, cooling device 108, first cooling device 202, and second cooling device 204 may pump the coolant into liquid cooled charging cable 106, receive the coolant back from liquid cooled charging cable 106, remove heat from the coolant that was received back, and then re-pump the cooled coolant back into liquid cooled charging cable 106. The coolant may be pumped at 0.8 GPM with coolant temperature rise of 6.7 degrees C.

The coolant may comprise a liquid that has a low conductivity and that is capable of cooling cable 106. For example, the coolant may provide cable 106 with: i) a calculated leakage current of 18 micro-amps for 15 feet of cable 106 at 50 micro-Siemens; and ii) a calculated power loss at 350a of 1.498 kw considering both supply conductor 118 and return conductor 120. The coolant may have a −35 degrees C. freezing point, conductivity of 0.36 micro-Siemens per centimeter, and a life of 2 to 3 years. The coolant may comprise Koolance LIQ-705, manufactured by Koolance of 2840 W Valley Hwy N, Auburn, WA 98001.

Consistent with embodiments of the disclosure, cooling device 108, first cooling device 202, and second cooling device 204 may pump the coolant directly around a bare (e.g., no insulation, no covering, etc.) electrical conductor (e.g., first supply sub-conductor 316, second supply sub-conductor 318, first return sub-conductor 320, second return sub-conductor 322, supply conductor 420, and return conductor 422), into a input terminal 600 attached to the electrical conductor, and into output terminal 500 attached to the electrical conductor in order to cool these components. Accordingly, cooling of the electrical conductor, input terminal connector 600, and output terminal connector 500 by the coolant may limit thermal resistance in the electrical conductor, input terminal connector 600, and output terminal connector 500 associated with these components due to heating caused by high electrical currents in these components.

The liquid coolant may be provided by either two independent isolated cooling devices (e.g., first cooling device 202 and second cooling device 204) or by one cooling device (e.g., cooling device 108) that has a sufficient liquid column length from the conductor (e.g., liquid cooled charging cable 106) to the cooling device or bifurcation point of the liquid coolant. The liquid column length along with an appropriate coolant conductivity may provide the required electrical isolation between a supply conductor (e.g., supply conductor 118) and a return conductor (e.g., load return connection 116) and either of these conductors to grounded cooling pumps (e.g., cooling device 108, first cooling device 202, and second cooling device 204).

Source End 142 Connections to Cooling Device 108 for the FIG. 1 Configuration

One input terminal 600 may be used as source supply connection 110 on supply conductor 118 at source end 142. For the configuration shown in FIG. 1, coolant supply conduit first section 130 may be connector to first input terminal tube second end 618 and over second plurality of first input terminal tube barbs 614 forming a watertight seal around first input terminal tube 604 at first input terminal tube second end 618. Also, coolant return conduit first section 138 may be connector to second input terminal tube second end 628 and over second plurality of second input terminal tube barbs 624 forming a watertight seal around second input terminal tube 606 at second input terminal tube second end 628.

Another input terminal 600 may be used as source return connection 112 on return conductor 120 at source end 142. For the configuration shown in FIG. 1, coolant supply conduit second section 132 may be connector to first input terminal tube second end 618 and over second plurality of first input terminal tube barbs 614 forming a watertight seal around first input terminal tube 604 at first input terminal tube second end 618. Also, coolant return conduit second section 140 may be connector to second input terminal tube second end 628 and over second plurality of second input terminal tube barbs 624 forming a watertight seal around second input terminal tube 606 at second input terminal tube second end 628.

Source End 142 Connections to Cooling Devices for the FIG. 2 Configuration

One input terminal 600 may be used as source supply connection 110 on supply conductor 118 at source end 142. For the configuration shown in FIG. 2, first coolant supply conduit 206 may be connector to first input terminal tube second end 618 and over second plurality of first input terminal tube barbs 614 forming a watertight seal around first input terminal tube 604 at first input terminal tube second end 618. Also, first coolant return conduit 208 may be connector to second input terminal tube second end 628 and over second plurality of second input terminal tube barbs 624 forming a watertight seal around second input terminal tube 606 at second input terminal tube second end 628.

Another input terminal 600 may be used as source return connection 112 on return conductor 120 at source end 142. For the configuration shown in FIG. 2, second coolant supply conduit 210 may be connector to first input terminal tube second end 618 and over second plurality of first input terminal tube barbs 614 forming a watertight seal around first input terminal tube 604 at first input terminal tube second end 618. Also, second coolant return conduit 212 may be connector to second input terminal tube second end 628 and over second plurality of second input terminal tube barbs 624 forming a watertight seal around second input terminal tube 606 at second input terminal tube second end 628.

Using Liquid Cooled Charging Cable 300 as Liquid Cooled Charging Cable 106 at Source End 142

At source end 142 of liquid cooled charging cable 106, regarding liquid cooled charging cable 300 as liquid cooled charging cable 106, first supply sub-conductor 316 may be crimped or otherwise electrically attached to first input terminal tube 604 at first input terminal tube first end 616. Consequently, first supply sub-conductor 316 may be in electrical connection with input terminal tab 602. First supply hose 304 may be pulled over first plurality of first input terminal tube barbs 612 forming a watertight seal around first input terminal tube first end 616. Similarly, second supply sub-conductor 318 may be crimped or otherwise electrically attached to second input terminal tube 606 at second input terminal tube first end 626. Consequently, second supply sub-conductor 318 may be in electrical connection with input terminal tab 602. First return hose 306 may be pulled over first plurality of second input terminal tube barbs 622 forming a watertight seal around second input terminal tube first end 626. In this embodiment, first supply sub-conductor 316 and second supply sub-conductor 318 may together function as two parallel conductors comprising supply conductor 118.

At source end 142 of liquid cooled charging cable 106, regarding liquid cooled charging cable 300 as liquid cooled charging cable 106, first return sub-conductor 320 may be crimped or otherwise electrically attached to first input terminal tube 604 at first input terminal tube first end 616. Consequently, first return sub-conductor 320 may be in electrical connection with input terminal tab 602. Second supply hose 308 may be pulled over first plurality of first input terminal tube barbs 612 forming a watertight seal around first input terminal tube first end 616. Similarly, second return sub-conductor 322 may be crimped or otherwise electrically attached to second input terminal tube 606 at second input terminal tube first end 626. Consequently, second return sub-conductor 322 may be in electrical connection with input terminal tab 602. Second return hose 310 may be pulled over first plurality of second input terminal tube barbs 622 forming a watertight seal around second input terminal tube first end 626. In this embodiment, first return sub-conductor 320 and second return sub-conductor 322 may together function as two parallel conductors comprising return conductor 120.

At Load End 144

One output terminal 500 may be used as Load supply connection 114 on supply conductor 118 at load end 144. Another output terminal 500 may be used as load return connection 116 on return conductor 120 at load end 144.

At load end 144 of liquid cooled charging cable 106, first supply sub-conductor 316 may be crimped or otherwise electrically attached to first output terminal tube 504 at first output terminal tube first end 514. Consequently, first supply sub-conductor 316 may be in electrical connection with output terminal tab 502. First supply hose 304 may be pulled over plurality of first output terminal tube barbs 512 forming a watertight seal around first output terminal tube first end 514. Similarly, second supply sub-conductor 318 may be crimped or otherwise electrically attached to second output terminal tube 506 at second output terminal tube first end 522. Consequently, second supply sub-conductor 318 may be in electrical connection with output terminal tab 502. First return hose 306 may be pulled over plurality of second output terminal tube barbs 520 forming a watertight seal around second output terminal tube first end 522. In this embodiment, first supply sub-conductor 316 and second supply sub-conductor 318 may together function as two parallel conductors comprising supply conductor 118.

At load end 144 of liquid cooled charging cable 106, first return sub-conductor 320 may be crimped or otherwise electrically attached to first output terminal tube 504 at first output terminal tube first end 514. Consequently, first return sub-conductor 320 may be in electrical connection with output terminal tab 502. Second supply hose 308 may be pulled over plurality of first output terminal tube barbs 512 forming a watertight seal around first output terminal tube first end 514. Similarly, second return sub-conductor 322 may be crimped or otherwise electrically attached to second output terminal tube 506 at second output terminal tube first end 522. Consequently, second return sub-conductor 322 may be in electrical connection with output terminal tab 502. Second return hose 310 may be pulled over plurality of second output terminal tube barbs 520 forming a watertight seal around second output terminal tube first end 522. In this embodiment, first return sub-conductor 320 and second return sub-conductor 322 may together function as two parallel conductors comprising return conductor 120.

Coolant Flow

For supply conductor 118, the coolant may flow into the inside first input terminal tube 604 from first input terminal tube second end 618. Because first input terminal tube 604 is connected to input terminal tab 602, the coolant may cool input terminal tab 602. The coolant may then flow out of first input terminal tube port 610 and into first supply hose 304. The coolant may surround first supply sub-conductor 316 and flow the length of first supply hose 304 to load end 144. Because first supply sub-conductor 316 is immersed in the coolant, heat from first supply sub-conductor 316 may be transferred into the coolant. At load end 144, the coolant may flow into first output terminal tube 504 at first output terminal tube port 510 to first output terminal tube second end 516 and into second output terminal tube 506 at second output terminal tube second end 524. Because the coolant is in output terminal tab 502, the coolant may also cool output terminal tab 502. The coolant may flow out of second output terminal tube 506 at second output terminal tube port 518 and into first return hose 306. The coolant may flow the length of first return hose 306 back to source end 142. Because second supply sub-conductor 318 is immersed in the coolant, heat from second supply sub-conductor 318 may be transferred into the coolant. The coolant may flow into second input terminal tube 606 at second input terminal tube port 620. Because second input terminal tube 606 is connected to input terminal tab 602, the coolant may cool input terminal tab 602. The coolant may then flow out of second input terminal tube 606 at second input terminal tube second end 628 back to cooling device 108 (e.g., FIG. 1 configuration) or first cooling device 202 (FIG. 2 configuration) to be cooled and reused.

For return conductor 120, the coolant may flow into the inside first input terminal tube 604 from first input terminal tube second end 618. Because first input terminal tube 604 is connected to input terminal tab 602, the coolant may cool input terminal tab 602. The coolant may then flow out of first input terminal tube port 610 and into second supply hose 308. The coolant may surround first return sub-conductor 320 and flow the length of second supply hose 308 to load end 144. Because first return sub-conductor 320 is immersed in the coolant, heat from first return sub-conductor 320 may be transferred into the coolant. At load end 144, the coolant may flow into first output terminal tube 504 at first output terminal tube port 510 to first output terminal tube second end 516 and into second output terminal tube 506 at second output terminal tube second end 524. Because the coolant is in output terminal tab 502, the coolant may also cool output terminal tab 502. The coolant may flow out of second output terminal tube 506 at second output terminal tube port 518 and into second return hose 310. The coolant may flow the length of second return hose 310 back to source end 142. Because second return sub-conductor 322 is immersed in the coolant, heat from second return sub-conductor 322 may be transferred into the coolant. The coolant may flow into second input terminal tube 606 at second input terminal tube port 620. Because second input terminal tube 606 is connected to input terminal tab 602, the coolant may cool input terminal tab 602. The coolant may then flow out of second input terminal tube 606 at second input terminal tube second end 628 back to cooling device 108 (e.g., FIG. 1 configuration) or first cooling device 202 (FIG. 2 configuration) to be cooled and reused.

Using Liquid Cooled Charging Cable 400 as Liquid Cooled Charging Cable 106 at Source End 142

One input terminal 600 may be used as source supply connection 110 on supply conductor 118 at source end 142. Another input terminal 600 may be used as source return connection 112 on return conductor 120 at source end 142.

At source end 142 of liquid cooled charging cable 106, regarding liquid cooled charging cable 400 as liquid cooled charging cable 106, supply conductor 420 may be crimped or otherwise electrically attached to first input terminal tube 604 at first input terminal tube first end 616. Consequently, supply conductor 420 may be in electrical connection with input terminal tab 602. First supply hose 404 may be pulled over first plurality of first input terminal tube barbs 612 forming a watertight seal around first input terminal tube first end 616. Then, first return hose 406 may be pulled over first plurality of second input terminal tube barbs 622 forming a watertight seal around second input terminal tube first end 626. In this embodiment, supply conductor 420 may function as supply conductor 118.

At source end 142 of liquid cooled charging cable 106, regarding liquid cooled charging cable 400 as liquid cooled charging cable 106, return conductor 422 may be crimped or otherwise electrically attached to first input terminal tube 604 at first input terminal tube first end 616. Consequently, first return sub-conductor 320 may be in electrical connection with input terminal tab 602. Second supply hose 408 may be pulled over first plurality of first input terminal tube barbs 612 forming a watertight seal around first input terminal tube first end 616. Then second return hose 410 may be pulled over first plurality of second input terminal tube barbs 622 forming a watertight seal around second input terminal tube first end 626. In this embodiment, return conductor 422 may function as return conductor 120.

At Load End 144

One output terminal 500 may be used as load supply connection 114 on supply conductor 118 at load end 144. Another output terminal 500 may be used as load return connection 116 on return conductor 120 at load end 144.

At load end 144 of liquid cooled charging cable 106, supply conductor 420 may be crimped or otherwise electrically attached to first output terminal tube 504 at first output terminal tube first end 514. Consequently, supply conductor 420 may be in electrical connection with output terminal tab 502. First supply hose 404 may be pulled over plurality of first output terminal tube barbs 512 forming a watertight seal around first output terminal tube first end 514. Then first return hose 406 may be pulled over plurality of second output terminal tube barbs 520 forming a watertight seal around second output terminal tube first end 522. In this embodiment, supply conductor 420 may function as supply conductor 118.

At load end 144 of liquid cooled charging cable 106, return conductor 422 may be crimped or otherwise electrically attached to first output terminal tube 504 at first output terminal tube first end 514. Consequently, return conductor 422 may be in electrical connection with output terminal tab 502. Second supply hose 408 may be pulled over plurality of first output terminal tube barbs 512 forming a watertight seal around first output terminal tube first end 514. Then second return hose 410 may be pulled over plurality of second output terminal tube barbs 520 forming a watertight seal around second output terminal tube first end 522. In this embodiment, return conductor 422 may function as return conductor 120.

Coolant Flow

For supply conductor 118, the coolant may flow into the inside first input terminal tube 604 from first input terminal tube second end 618. Because first input terminal tube 604 is connected to input terminal tab 602, the coolant may cool input terminal tab 602. The coolant may then flow out of first input terminal tube port 610 and into first supply hose 404. The coolant may surround supply conductor 420 and flow the length of first supply hose 404 to load end 144. Because supply conductor 420 is immersed in the coolant, heat from supply conductor 420 may be transferred into the coolant. At load end 144, the coolant may flow into first output terminal tube 504 at first output terminal tube port 510 to first output terminal tube second end 516 and into second output terminal tube 506 at second output terminal tube second end 524. Because the coolant is in output terminal tab 502, the coolant may also cool output terminal tab 502. The coolant may flow out of second output terminal tube 506 at second output terminal tube port 518 and into first return hose 406. The coolant may flow the length of first return hose 406 back to source end 142. The coolant may flow into second input terminal tube 606 at second input terminal tube port 620. Because second input terminal tube 606 is connected to input terminal tab 602, the coolant may cool input terminal tab 602. The coolant may then flow out of second input terminal tube 606 at second input terminal tube second end 628 back to cooling device 108 (e.g., FIG. 1 configuration) or first cooling device 202 (FIG. 2 configuration) to be cooled and reused.

For return conductor 120, the coolant may flow into the inside first input terminal tube 604 from first input terminal tube second end 618. Because first input terminal tube 604 is connected to input terminal tab 602, the coolant may cool input terminal tab 602. The coolant may then flow out of first input terminal tube port 610 and into second supply hose 408. The coolant may surround return conductor 422 and flow the length of second supply hose 408 to load end 144. Because return conductor 422 is immersed in the coolant, heat from return conductor 422 may be transferred into the coolant. At load end 144, the coolant may flow into first output terminal tube 504 at first output terminal tube port 510 to first output terminal tube second end 516 and into second output terminal tube 506 at second output terminal tube second end 524. Because the coolant is in output terminal tab 502, the coolant may also cool output terminal tab 502. The coolant may flow out of second output terminal tube 506 at second output terminal tube port 518 and into second return hose 410. The coolant may flow the length of second return hose 410 back to source end 142. The coolant may flow into second input terminal tube 606 at second input terminal tube port 620. Because second input terminal tube 606 is connected to input terminal tab 602, the coolant may cool input terminal tab 602. The coolant may then flow out of second input terminal tube 606 at second input terminal tube second end 628 back to cooling device 108 (e.g., FIG. 1 configuration) or first cooling device 202 (FIG. 2 configuration) to be cooled and reused.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A cable comprising:
    a supply hose comprising;
        a supply hose interior surface,
        a supply hose interior cavity defined by the supply hose interior surface, and
        a first sub-conductor being disposed within the supply hose interior cavity, wherein a supply hose interior space is formed between the first sub-conductor and the supply hose interior surface within the supply hose interior cavity, and wherein the supply hose interior space provides a supply pathway for supply hose coolant;
    a return hose comprising;
        a return hose interior surface,
        a return hose interior cavity defined by the return hose interior surface, and
        a second sub-conductor being disposed within the return hose interior cavity, wherein a return hose interior space is formed between the second sub-conductor and the return hose interior surface within the return hose interior cavity, and wherein the return hose interior space provides a return pathway for the supply hose coolant supplied through the supply hose interior space by merging the supply hose to the return hose at a load and wherein the supply pathway is connected to a cooling device through a coolant supply conduit and wherein the return pathway is connected to the cooling device through a coolant return conduit, wherein the first sub-conductor supplies current to the load and the second sub-conductor supplies current to the load; and
    a jacket comprising;
        a jacket interior surface, and
        a jacket interior cavity defined by the jacket interior surface wherein the supply hose and the return hose are only disposed in the jacket interior cavity and wherein the coolant supply conduit and the coolant return conduit are only disposed outside the jacket.

2. The cable of claim 1, further comprising a pilot cable disposed in the jacket interior cavity.

3. The cable of claim 2, wherein the pilot cable is disposed between the supply hose and the first return hose.

4. The cable of claim 1, further comprising a plurality of pilot wires disposed in the jacket interior cavity.

5. The cable of claim 1, further comprising a ground wire disposed in the jacket interior cavity.

6. The cable of claim 1, wherein the supply hose and the first return hose are adjacent to the jacket interior surface.

7. The cable of claim 1, wherein the supply hose is concentric with the first sub-conductor.

8. The cable of claim 1, wherein the return hose is concentric with the second sub-conductor.

9. The cable of claim 1, wherein the load comprises batteries of an electric vehicles.

10. A cable comprising:
a pilot cable;
a ground wire;
a supply hose comprising;
   a supply hose interior surface,
   a supply hose interior cavity defined by the supply hose interior surface, and
   a first sub-conductor being disposed within the supply hose interior cavity, wherein a supply hose interior space is formed between the first sub-conductor and the supply hose interior surface within the supply hose interior cavity, and wherein the supply hose interior space provides a supply pathway for supply hose coolant;
a return hose comprising;
   a return hose interior surface,
   a return hose interior cavity defined by the return hose interior surface, and
   a second sub-conductor being disposed within the return hose interior cavity, wherein a return hose interior space is formed between the second sub-conductor and the return hose interior surface within the return hose interior cavity, and wherein the return hose interior space provides a return pathway for the supply hose coolant supplied through the supply hose interior space by merging the supply hose to the return hose at a load and wherein the supply pathway is connected to a cooling device through a coolant supply conduit and wherein the return pathway is connected to the cooling device through a coolant return conduit, wherein the first sub-conductor supplies current to the load and the second sub-conductor supplies current to the load; and
a jacket comprising;
   a jacket interior surface, and
   a jacket interior cavity defined by the jacket interior surface wherein the pilot cable, the ground wire, the supply hose, and the return hose are disposed in the jacket interior cavity and wherein the coolant supply conduit and the coolant return conduit are disposed outside the jacket.

11. The cable of claim 10, wherein the pilot cable is disposed between the supply hose and the first return hose.

12. The cable of claim 10, further comprising a plurality of pilot wires disposed in the jacket interior cavity.

13. The cable of claim 10, wherein the supply hose and the first return hose are adjacent to the jacket interior surface.

14. The cable of claim 10, wherein the first sub-conductor is uninsulated.

15. The cable of claim 10, wherein the second sub-conductor is uninsulated.

16. The cable of claim 10, wherein the supply hose is concentric with the first sub-conductor.

17. The cable of claim 10, wherein the return hose is concentric with the second sub-conductor.

* * * * *